United States Patent
Skergan et al.

(10) Patent No.: US 6,452,435 B1
(45) Date of Patent: Sep. 17, 2002

(54) METHOD AND APPARATUS FOR SCANNING AND CLOCKING CHIPS WITH A HIGH-SPEED FREE RUNNING CLOCK IN A MANUFACTURING TEST ENVIRONMENT

(75) Inventors: Timothy M. Skergan, Austin, TX (US); Johnny J. LeBlanc, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,112

(22) Filed: Nov. 8, 1999

(51) Int. Cl.[7] .............................. G06F 1/04; H03K 3/00
(52) U.S. Cl. ...................................... 327/293; 714/731
(58) Field of Search ................................. 327/202, 292, 327/293, 295, 296, 141, 144, 145; 714/726, 727, 731

(56) References Cited

U.S. PATENT DOCUMENTS

| | | | |
|---|---|---|---|
| 5,039,939 A | 8/1991 | Dick et al. .................. 324/158 |
| 5,509,019 A | 4/1996 | Yamamura .................. 371/21.1 |
| 5,640,402 A | * 6/1997 | Motika et al. ............... 714/724 |
| 5,761,215 A | 6/1998 | McCarthy et al. ....... 371/22.31 |
| 5,783,960 A | 7/1998 | Lackey ........................ 327/295 |
| 5,900,757 A | 5/1999 | Aggarwal et al. .......... 327/198 |
| 6,058,496 A | * 5/2000 | Gillis et al. .................. 324/765 |
| 6,204,713 B1 | * 3/2001 | Adams et al. .............. 327/293 |

* cited by examiner

Primary Examiner—My-Trang Nu Ton
(74) Attorney, Agent, or Firm—Duke W. Yee; Volel Emile; Vincent J. Allen

(57) ABSTRACT

A method and apparatus for pipelining clock control signals across a chip. The present invention avoids the need for multiple clock distribution systems by allowing clock controls for clock stopping, scanning, and debugging to be distributed to all local clock buffers through pipelined non-scan latches. The test control pipeline latches may be routed along with the clock through the clock receiver, the central clock buffer, and the sector buffer areas of the chip. A relatively low speed testing mechanism may be used to drive the testing of the chip externally. The test clock control signals are synchronized with a free-running clock on the chip to allow the circuit to be operated at speed during the testing of the chip.

10 Claims, 5 Drawing Sheets

METHOD AND APPARATUS FOR SCANNING AND CLOCKING CHIPS WITH A HIGH-SPEED FREE RUNNING CLOCK IN A MANUFACTURING TEST ENVIRONMENT

BACKGROUND OF THE INVENTION

1. Technical Field

The present invention relates to clock signal control for integrated circuits, and more-particularly, to method and system for propagating a clock control signal across a chip.

2. Description of Related Art

During the manufacture of digital integrated circuits, it is essential that the integrated circuit be tested to ensure that it matches the functional specification and that only defect-free production chips are packaged and shipped to the customer. After the chips have been manufactured, an external testing machine may be used to determine whether there are any defects in the chip. As the density of circuitry on a chip continues to increase with advances in technology and as the number of input/output pins remains small, testing becomes more complex and more costly.

Today, design for testing is a large portion of the chip design. Certain portions of the chip may be dedicated only for testing. Level-Sensitive Scan Design (LSSD) is a design technique used for designing test circuits on a chip. LSSD imposes strict rules on clock signal usage to allow the implementation of sequential scan latches for testing the circuit. LSSD is commonly known in the art and provides rigid clocking rules in order to prevent data input to the scan latches from changing while the clock pulse is transitioning. Thus, the digital circuit is comprised of two sections: (1) a combinational circuit; and (2) a set of sequential scan latches used to test the circuit. The latches are used such that during testing the value of each latch may be individually controlled and observed by shifting (i.e., scanning) a serial vector into/out of the scan latch. Because the latches inside the circuit are effectively input/output terminals, the testing of the circuit is simplified while maintaining a small number of input-output pins on the chip. The LSSD technique allows more inputs/outputs for testing the circuit than are actually available at the boundary of the chip.

When using LSSD techniques, it is necessary to supply a test clock and test controls to operate the chip in a test mode. Currently, a separate clock distribution system is used to distribute the clock and control signals to the scan latches. Thus, instead of having only one H-tree clock distribution system, for example, the integrated circuit contains at least two H-tree clock distribution systems. One is for the high-performance clock which is used to drive the functional or dynamic logic on the chip, and one is used to drive the test logic.

It is desirable to test a chip "at speed," i.e., the normal operating speed of the chip. When tested in this manner, defects which only arise at the normal operating speed of the chip can be detected by the test circuitry. The problem with testing the chip at speed is that as clock speeds increase on chips, the complex balancing of timing between the system clock tree and the test clock tree becomes even more difficult and costly. Furthermore; the expensive testing equipment currently used to test the chips cannot be operated at the same speed as the system clock. Thus, the chip must be tested in the manufacturing environment at a speed lower than that at which it would normally operate. The problem with testing at a lower speed is that all of the defects in the chip may not show up at the lower test speed. Therefore, the customer may actually be the first one to learn of a defect when the chip is put into operation.

Thus, a method and system for testing is needed which allows the chip to be tested at speed while also allowing the expensive test equipment which is currently in use to be utilized to perform such testing. It is also desirable to require only one tightly tuned high speed clock distribution system because of the added complexity and increased wiring that results from the use of multiple clock distribution systems.

SUMMARY OF THE INVENTION

The present invention avoids the need for multiple clock distribution systems by allowing clock controls for clock stopping, scanning, and debugging to be distributed to all local clock buffers through pipelined non-scan latches. The test control pipeline latches may be routed along with the clock through the clock receiver, the central clock buffer, and the sector buffer areas of the chip. A relatively low speed testing mechanism may be used to drive the testing of the chip externally. The test clock control signals are synchronized with a free-running clock on the chip to allow the circuit to be operated at speed during the testing of the chip.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
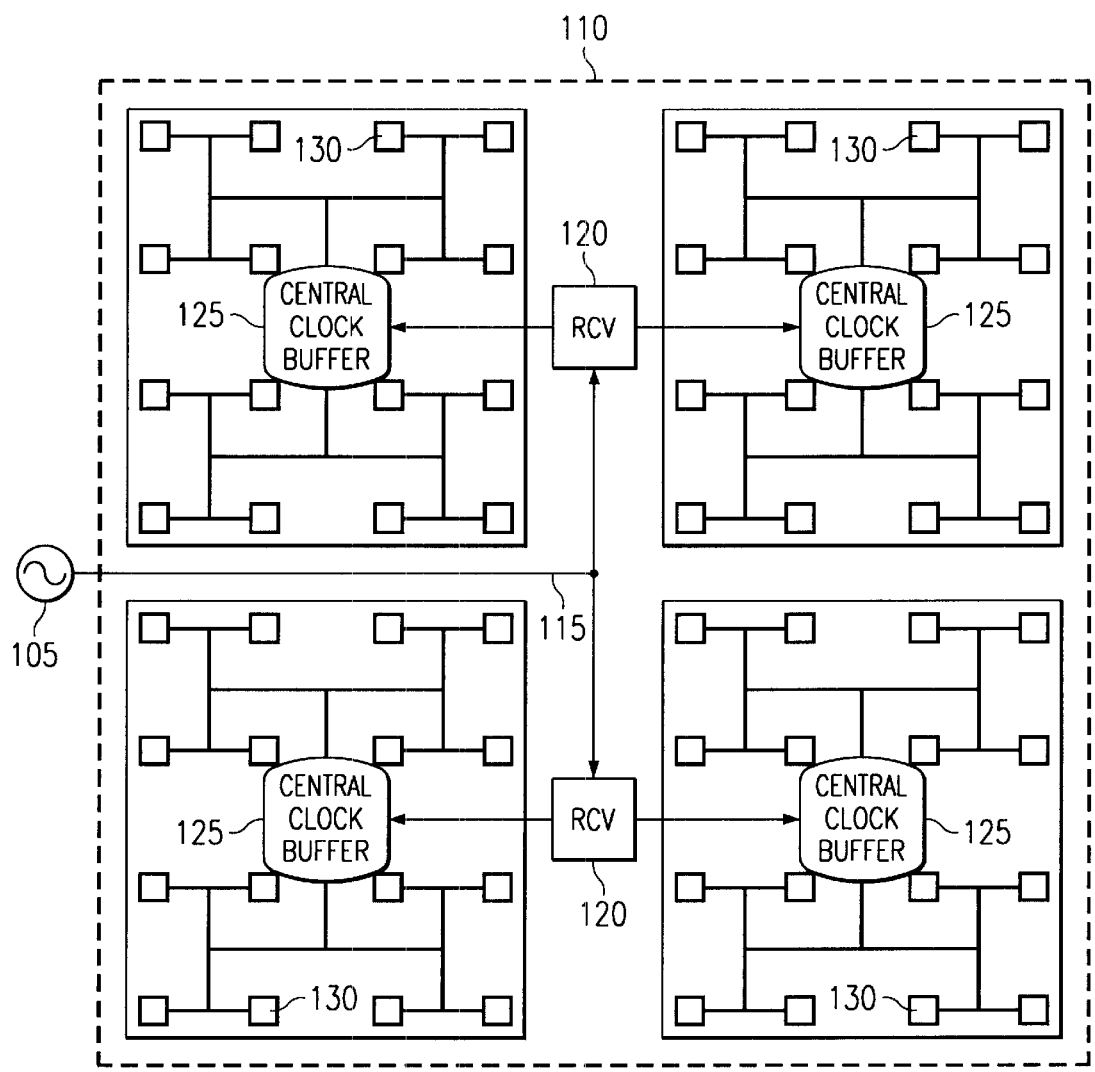
FIG. 1 is a schematic diagram of a clock distribution system in a preferred embodiment of the present invention.

Referring now to FIG. 1, a schematic diagram of a clock distribution system in a preferred embodiment of the present invention is shown. A clock source 105 is input into chip 110 from an oscillator source such as a saw-tooth wave generator or a phase-locked loop type clock source by way of wiring 115 on the chip. This oscillator signal is input into two receiver circuits 120. Receiver circuits 120 each drive two central clock buffers 125. Each clock buffer 125 in turn drives an H-tree that terminates with 16 sector buffers 130 used to re-power the clock signal. Each sector buffer 130 then drives a secondary H-tree (not shown) which terminates onto a single clock mesh (not shown), also called a clock grid, covering the entire chip area. The clock mesh is a series of vertical and horizontal low resistive wires that short together the outputs of all the clock buffers of the secondary H-tree, thus minimizing clock skew across the chip.

The clock mesh serves as the clock reference point (mclk) for the chip. The mclk signal is a "free-running" clock signal in that the clock never stops unless there is a problem with the clock source or distribution system. Devices such as latches, dynamic logic, and RAMs tap onto the mesh through local clock buffer circuits which are attached to the mesh. Some devices also connect directly to the mesh without being gated by a local clock buffer. The present invention is not limited to the method described here for distributing the "free-running" clock. One skilled in the art will recognize that other methods of distributing the clock may be implemented without departing from the scope and spirit of the invention.

Figure 2:
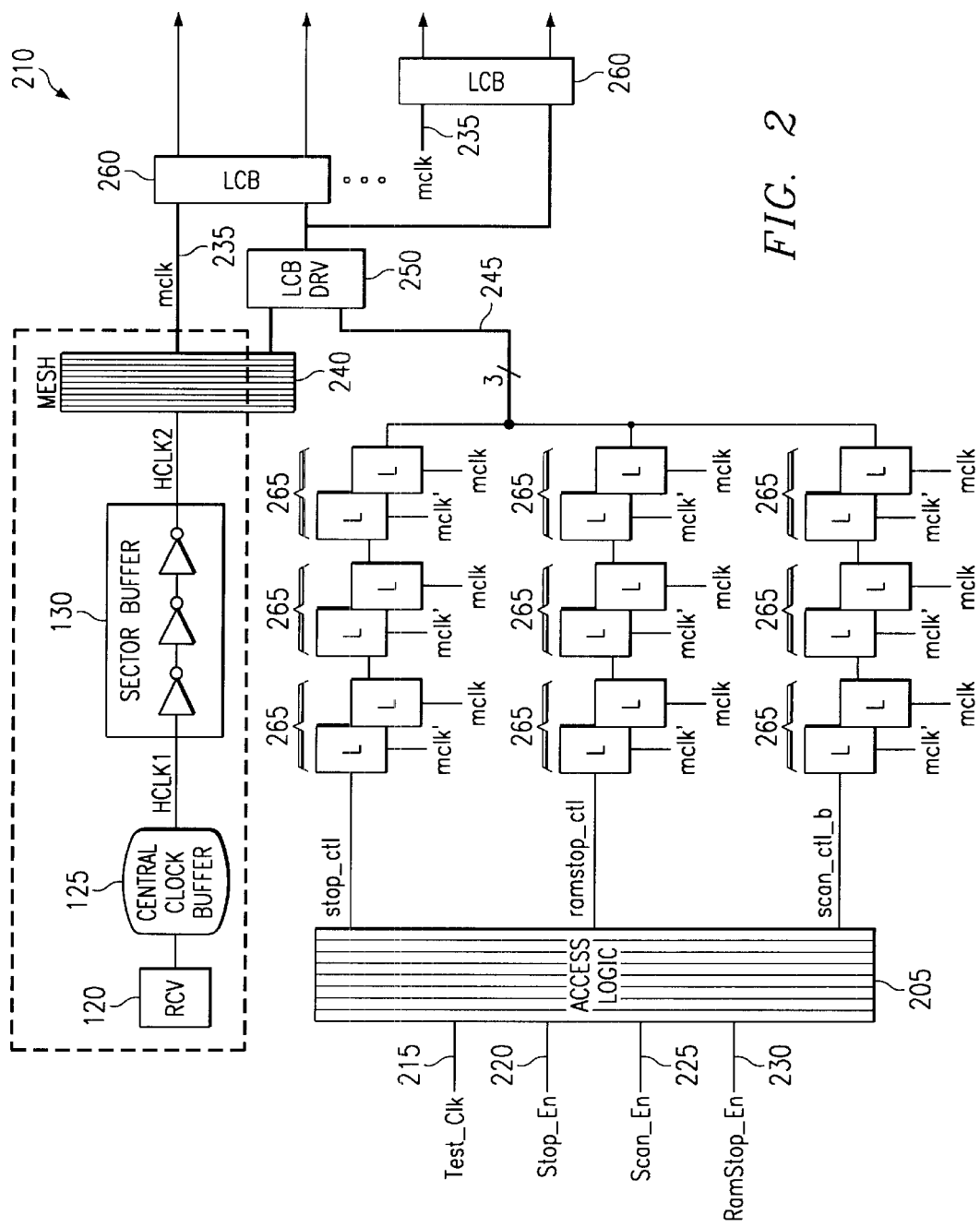
FIG. 2 is a schematic diagram of a preferred embodiment of the present invention.

Referring now to FIG. 2, a schematic diagram of a preferred embodiment of the present invention is shown. Throughout this description, identical numerals are used in the figures to denote like components. A tester is used to provide primary inputs to access logic 205. The test equipment is external to chip 210. The test signals which are input to the access logic on the chip are Test_Clk 215, Stop_En 220, Scan_En 225, and RAMStop_En 230. Access logic 205 is used both to synchronize Test_Clk 215 with mesh clock signal (mclk) 235, and to generate a pulse of the same width as a period of the mesh clock. The particular logic used in access logic 205 is described in further detail with reference to FIG. 3 below. The clock controls Stop_En 220, Scan_En 225, and RAMStop_En 230 may be conveniently propagated through the chip parallel to the path of the clock distribution system. However, one skilled in the art will recognize that other fanout schemes may be used.

The purpose of clock controls 220, 225, and 230 is to control the internal scanning and clocking of the chip when in a test mode. In a preferred embodiment, Stop_En 220 is used to prevent the mesh clock from clocking the functional devices of the circuit while in the LSSD test mode. Whenever Stop_En 220 is low, a system clock pulse is generated at the output of the local clock buffer for each rising edge of Test_Clk 215. Test_Clk 215 is the LSSD test clock that is sourced by the manufacturing tester under the control of test patterns. When not in the test mode, Stop_En 220 is always high and the mesh clock propagates through local clock buffers 260 ungated.

Scan_En 225 is a clock control signal used to enable serial shifting of the LSSD scan chains in the chip. When Scan_En 225 is asserted, one serial shift clock pulse is generated for each rising edge of Test_Clk 215. The shift clock pulse causes the shift register in the LSSD chain to shift one bit. RAMStop_En 230 is a clock control signal which is similar in effect to Stop_En 220 except that the effect is to force the chip memory array clocks offline whenever the signal is asserted. When RAMStop_En 230 is low, an array clock pulse is generated for each rising edge of Test_Clk 215. In normal operation, RAMStop_En 230 is high.

The frequency of Test_Clk 215 from the external tester has a much lower frequency than the mesh clock. Depending on the speed of the tester and the speed of the circuit being tested, the test clock may be more than 80 times slower than the mesh clock, but at a minimum it must be two times slower to allow the synchronizers within access logic 205 time to generate a pulse. In the case where a test clock speed equal to the mesh clock is required, the synchronizers within access logic 205 are bypassed. The control signals 220, 225 and 230 are used to gate the mesh clock at the local clock buffers of all the latches on the chip except for logic which must be connected directly to the mesh clock.

When operating in a test mode, it is necessary to distribute the clock controls to various locations on the chip. In a preferred embodiment, the clock controls are piped alongside the normal clock distribution of the chip through each clock receiver 120, through each central clock buffer 125, through each sector buffer 130, to each local clock buffer driver 250. However, the clock controls are not physically connected to the clock distribution system for controlling the clock until the controls reach a local clock buffer 260. In a preferred embodiment of the present invention, there are anywhere from 20 to 80 local clock buffer drivers 250. From each local clock buffer driver 250 there are a total of 16 local clock buffers 260. Local clock buffers 260 are used to drive latches, dynamic logic, RAMs, and other functional parts on the chip including scan latches used for testing. There may be thousands of latches present on a given chip.

Pipelining the clock control signals through latches is necessary for today's high speed chips. The maximum distance that an electrical signal can travel with optimal buffering within one mesh clock period is approximately 10,000 wiring tracks. Because the "Manhattan distance," i.e., the distance from the chip center to chip corner is 60,000 wiring tracks, the control signals cannot be distributed directly to the various parts of the chip within one clock period. Latch pairs 265 are used to pipeline the clock controls from access logic 205 to the local clock buffers 260 and are clocked directly from mesh clock 240. The first latch in a pair 265 is referred to as the "master" latch and is gated by the falling edge of mclk 235. The second latch in the pair is referred to as the "slave" latch and is gated by the rising edge of mclk 235. Thus, the number of mclk 235 cycles needed for a clock control signal to propagate from access logic 205 to local clock buffer 260 is determined by the number of latch pairs between access logic 205 and local clock buffer 260. The number of latch stages that are chosen for a particular design is not important to the present invention. However, the number of latches chosen should be such that the delays to all of the local clock buffers caused by the pipelining of the control signals are the same regardless of the distance from access logic 205. When the circuit is constructed in this manner, the control signals reach each local clock buffer on the chip during the same cycle of mclk 235. Because Test_Clk 215 runs at a much slower frequency than mclk 235, the pipelining has no effect on the operation of the external tester. This enables the tester to be used as if it is running at the same speed as mclk 240.

Figure 3:
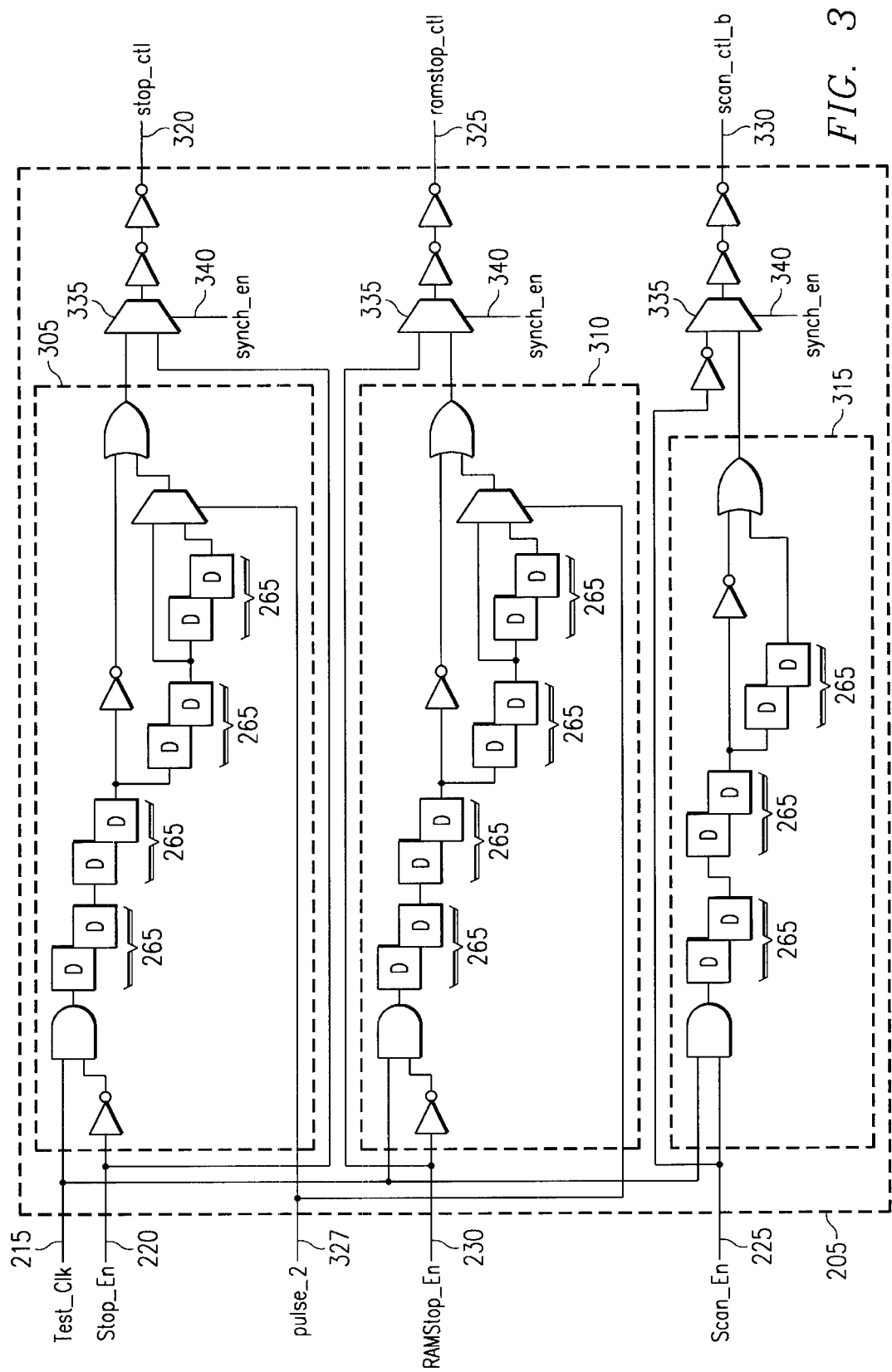
FIG. 3 is a schematic diagram of an embodiment of the access logic shown in FIG. 2 shown in greater detail.

Referring now to FIG. 3, a schematic diagram of an embodiment of access logic 205 of FIG. 2 is shown in greater detail. The primary inputs from the external tester are input into access logic 205. The primary inputs are Test_Clk 215, Stop_En 220, RAMStop_En 230, and Scan_En 225. Synchronizers 305, 310, 315 within the access logic 205 represent separate modules for synchronizing Test_Clk 215 with mesh clock 240 and for generating a pulse representing the corresponding control signal 220, 225, 230 that is input into access logic 205.

Stop_En 220 and RAMStop_En 230 are both active low signals, meaning that when the signal is low a pulse is generated at the output of the synchronizer on the rising edge of Test_Clk 215. Thus, if Stop_En 220 is low on the leading edge of Test_Clk 215, then the output of access logic 205 at stop_ctl 320 is a pulse which is active low. Similarly, if RAMStop_En 230 is low on the leading edge of Test_Clk 215, then an active low pulse is generated at ramstop_ctl 325. Scan_En 225 on the other hand is active high. Thus, whenever Scan_En 225 is high on the leading edge of Test_Clk 215, the output of access logic 205 at scan_ctl_b 330 is a pulse which is active low.

When the chip is operating in the test mode, the rising edge of Test_Clk 215 triggers a pulse at the outputs of access logic 205 depending on which clock control signals 220, 225, 230 are asserted. For example, consider a case where RAMStop_En 230 is logically false, that is in a non-enabled condition where the control signal is not forcing the RAM clocks to be stopped. In this case, while Test_Clk 215 is on a rising edge, a pulse is generated at the output ramstop_ctl 325 which permits a single system clock of the RAMS when the pulse reaches the end of the clock control pipeline.

The pulse width at the outputs 320, 325, 330 of access logic 205 is much smaller than the pulse width of Test_Clk 215 because mesh clock 240 is running at a much higher frequency. Mesh clock 240 is used to clock the latch pairs 265 that are shown in synchronizers 305, 310, 315. In order to allow two or more back-to-back, or contiguous, high speed system clocks to the latches, the turning off of a clock control pulse may be selectively delayed one or more clock cycles by adding additional pipeline latches in the leg of the synchronizers 305, 310 that shuts off the pulse. The number of cycles that the pulse width is elongated is selectable from test pins into the chips. Typically, these "pulse width" select pins are shared with functional inputs. In FIG. 3, pulse_2 327 is used to elongate the pulse. Pulse_2 is shared with a functional pin in order to reduce the number of dedicated test pins on the chip package.

A multiplexer 335 is used on the output of each of synchronizers 305, 310, 315 to select between either the output of the respective synchronizer 305, 310, 315 or a direct connection to the respective primary inputs 220, 225, 230. When the free-running mesh clock is operable, sync_en 340 is set active to select the output from synchronizers 305, 310, 315. The synchronizing feature of the invention would not be used, for example, when the chip is in a brain-dead mode. In other words, if the free-running oscillator clock on the mesh is non-functional, the test clock may be used to directly drive the H-tree mesh and there would be no need to synchronize the test clock with the mesh clock.

Figure 4:
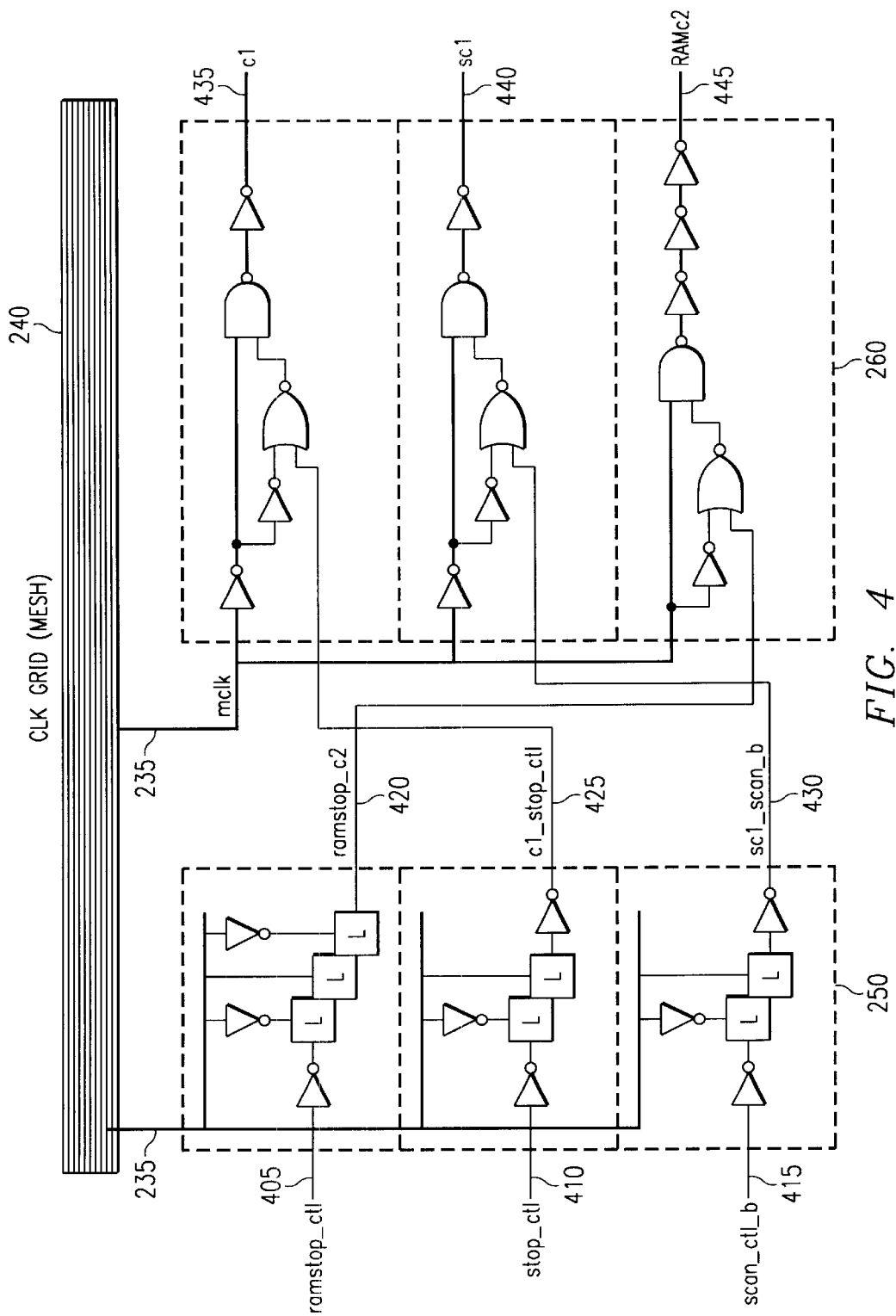
FIG. 4 is a schematic diagram illustrating the local clock buffer driver 250 and a local clock buffer 260 of FIG. 2 in greater detail.

Referring now to FIG. 4, a schematic diagram illustrating local clock buffer driver 250 and local clock buffer 260 of FIG. 2 in greater detail is shown. The logic shown is limited to that necessary for understanding the invention. However, local clock buffer driver 250 and local clock buffer 260 may include additional logic and control inputs for operating in different modes. The control signals ramstop_ctl 405, stop_ctl 410, and scan_ctl_b 415 are all input into local clock buffer driver 250 from the end of the pipeline of non-scan latches through which they were distributed across the chip. Within the local clock buffer driver 250, control signals 405, 410, 415 are amplified and sent through additional latch pairs and are output to local clock buffer 260 which are driven by the local clock buffer driver 250. At the output of local clock buffer driver 250, ramstop_ctl 405 is represented as ramstop_c2 420. Stop_ctl 410 becomes c1_stop_ctl 425 and scan_ctl_b 415 becomes sc1_scan_b 430. The designation of the signal will become important later in reference to the timing diagram shown in FIG. 5.

As long as c1_stop_ctl 425 remains high, the output c1 of local clock buffer 260 remains low. However, when a pulse is generated by the pulse generator and synchronizer of access logic 205 of FIG. 2, one pulse of the mesh clock is allowed to output c1 435. The output c1 435 may be connected to various logical devices on the chip. Similarly, when sc1_scan_b 430 is pulsed, an output pulse is seen at sc1 440. For example, the sc1 signal may be connected to a scannable latch on the chip. Similarly, when a pulse is received at ramstop_ctl 405, a pulse is generated at ramstop_c2 420. This causes a pulse to be generated at RAM_c2 445. The width of all of the pulses is the same width as mesh clock 235.

The delay from the leading edge of Test_Clk 215 to the leading edge of the pulse that is generated at the output of the local clock buffer driver 250 is determined by the number of latches that exist in the non-scan pipeline. So, for example, if there are eight stages or pairs of latches between access logic 205 and the output of local clock buffer driver 260, then the delay between the leading edge of Test_Clk 215 and the pulse that is generated on the output will be approximately eight cycles of mesh clock 235.

Figure 5:
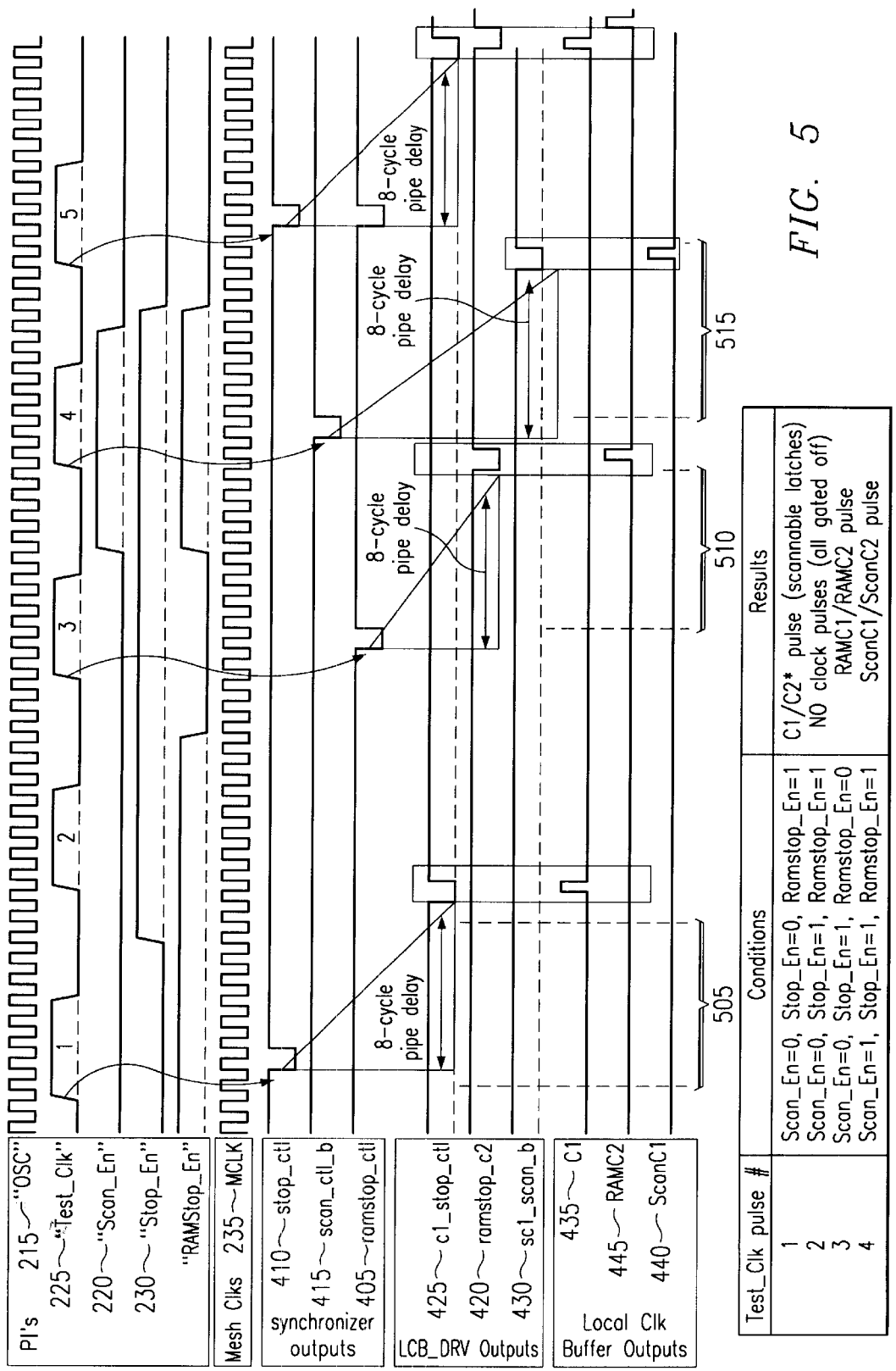
FIG. 5 is a timing diagram for the operation of a preferred embodiment of the invention shown in FIGS. 2–4.

Referring now to FIG. 5, a timing diagram for the operation of a preferred embodiment of the invention shown in FIGS. 2–4 is illustrated. The first line of the timing diagram labeled "OSC" shows that the free-running clock on the mesh is active. The timing diagram is shown for the situation in which the chip is in a test mode. The primary inputs Test_Clk 215, Scan_En 225, Stop_En 220, and RAMStop_En 230 are shown at the top of the diagram. Note that the mesh clock 235 is also shown and coincides with the free-running oscillator clock OSC.

During the first rising edge of Test_Clk 215, Scan_En 225 and Stop_En 220 are both low. RAMStop_En 230 is high. As previously described, Scan_En 225 is active high, whereas Stop_En 220 and RAMStop_En 230 are active low. Thus, the only signals which are active at the first rising edge of Test_Clk 215 is Stop_En 220. Because Stop_En 220 is low during the first rising edge of Test_Clk 215, a pulse is generated at output stop_ctl 410 of access logic 205. A pulse on stop_ctl 410 results in a pulse at output c1_stop_ctl 425 from the local clock buffer driver which is delayed in time by eight cycles of mesh clock 235.

The timing diagram of FIG. 5 is thus representative of the case where there are eight stages of pipeline latches for piping the control signals between the output of access logic 205 and the output of a local clock buffer driver. Eight latch stages are not shown in the previous schematics in order to avoid cluttering the figures. However, the timing diagram as shown here is based on eight stages of pipeline delay.

The pulse at the local clock buffer driver output c1_stop_ctl 425 then causes a pulse to be generated at local clock buffer output c1 435 which is equal in width to one mesh clock pulse and synchronous with the mesh clock. At the second rising edge of Test_Clk 215, no pulses are generated at the output of local clock buffer. The reason is that all of the clock control signals 220, 225, 230, are inactive. Thus, no clock pulses are generated. At the third rising edge of Test_Clk 215, RAMStop_En 230 is low. This results in a pulse being generated at output ramstop_ctl 405 of access logic 205. Eight cycles of mesh clock 235 later, a pulse is shown at output ramstop_ctl 420 of the local clock buffer driver. This results in a pulse being generated at the output RAMc2 445 of the local clock buffer. This pulse is also synchronous with and equal to the pulse width of mesh clock 235. At the fourth rising edge of Test_Clk 215, Scan_En 225 is active. Thus, a pulse is generated at output scan_ctl_b 415 of access logic 205. Eight cycles of mesh clock 235 later, a pulse is seen at output sc1 440 of the local clock buffer.

The advantage of using the pipelining method described above for sending control signals to various parts of the chip is that only one high speed clock source is needed for testing the chip. Furthermore, pipelining provides a mechanism for distributing the control signal across the chip without the need for complex timing considerations to be taken into account. Considerable engineering effort, analysis, and integration priority are focused on the distribution of the high speed clock in order to minimize the percentage of skew of the clock seen between two latches on the chip. Clock skew is introduced by variations in semiconductor properties introduced by the fabrication process as well as spatial and temporal variations in power supply voltages and temperatures. Pipelining the clock control signals through latches that are clocked by the high speed clock eliminates this complex timing analysis and design because the clock control signals simply propagate across latch boundaries synchronous with a clock, the single high speed clock. As long as the number of pipelining latch pairs from access logic 205 to each local clock buffer is equal, the delay to each local clock buffer will also be equal and the clock controls will gate, and likewise ungate, the high speed clock to all the latches on the same clock edge.

Furthermore, it has become physically impossible to distribute control signals across the chip to a local clock buffer without using pipelined latches because of the increased clock speeds coupled with increased density of current chips. As the density of a chip goes up, the width of the wiring on the chip decreases, causing resistance to go up. The time of propagation of electrical signals on silicon chips is bounded theoretically by the speed of light, but more practically by the time constant that is a function of wire resistance and capacitance. In order to propagate a signal across the largest semiconductor chips synchronously with the high speed clock, the signal must be pipelined through latches clocked by the high speed clock.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for distributing a clock control signal on an integrated circuit, comprising the following steps:

inputting a pulse representing the clock control signal into a first end of a pipeline comprising a plurality of latch pairs connected in series; and clocking each of the plurality of latch pairs with a system clock such that the pulse is propagated through the pipeline to a second end of the pipeline, wherein a time delay between the inputting of the pulse and an arrival of the pulse at the second end of the pipeline is equal to a number of cycles of the system clock, wherein the number of cycles is equal to a number of the plurality of latch pairs in the pipeline.

2. The method of claim 1 further comprising the steps:

generating a test clock signal from an external tester wherein a frequency of the test clock signal is smaller than a frequency of the system clock;

generating the clock control signal with the external tester;

generating the pulse representing the clock control signal, wherein the pulse generation is triggered by an edge of the test clock signal.

3. The method of claim 2 wherein the number of the plurality of latch pairs in the pipeline is smaller than a number of system clock cycles contained within one cycle of the test clock signal.

4. The method of claim 3 further comprising the steps:

inputting the pulse representing the clock control signal into a first end of a second or more pipeline comprising a second or more plurality of latch pairs, wherein the number of latch pairs in the second or more plurality of latch pairs is equal to the number of the plurality of latch pairs in the pipeline; and clocking the latch pairs in the second or more pipeline with the system clock such that the pulse is propagated through the pipeline to a second end of the second or more pipeline, wherein the pulse arrives at the second end of the second or more pipeline during a same cycle of the system clock as the pulse arrives at the second end of the pipeline.

5. The method of claim 4 further comprising the step:

gating the system clock to a logical device based on a pulse received at the second end of the pipeline.

6. A system for distributing a clock control signal on an integrated circuit, comprising:

a system clock generator for generating a system clock;

a means for distributing the system clock across the chip;

a plurality of latch pairs connected in series to form a pipeline, wherein the plurality of latch pairs are connected to the means for distributing the system clock such that the system clock gates the plurality of latch pairs;

a means for inputting a pulse representing the clock control signal into a first end of the pipeline; and a means for clocking each of the plurality of latch pairs with the system clock such that the pulse is propagated through the pipeline to a second end of the pipeline, wherein a time delay between the inputting of the pulse-and an arrival of the pulse at the second end of the pipeline is equal to a number of cycles of the system clock generator, wherein the number of cycles is equal to a number of the plurality of latch pairs in the pipeline.

7. The system of claim 6 further comprising:

an external tester for generating a test clock signal and the clock control signal, wherein a frequency of the test clock signal is smaller than a frequency of the system clock; and a means for generating the pulse representing the clock control signal, wherein the pulse generation is triggered by an edge of the test clock signal.

8. The system of claim 7 wherein the number of the plurality of latch pairs in the pipeline is smaller than a number of system clock cycles contained within one cycle of the test clock signal.

9. The method of claim 8 further comprising:

a second or more pipeline comprising a second or more plurality of latch pairs, wherein a number of latch pairs in the second or more plurality of latch pairs is equal to the number of the plurality of latch pairs in the pipeline;

means for inputting the pulse representing the clock control signal into a first end of the second or more pipeline comprising a second or more plurality of latch pairs; and means for clocking the plurality of latch pairs in the second or more pipeline with the system clock such that the pulse is propagated through the pipeline to a second end of the second or more pipeline, wherein the pulse arrives at the second end of the second or more pipeline during a same cycle of the system clock as the pulse arrives at the second end of the pipeline.

10. The system of claim 9 further comprising:

means for gating the system clock to a logical device based on a pulse received at the second end of the pipeline.

* * * * *